United States Patent [19]

Stewart et al.

[11] 4,257,105

[45] Mar. 17, 1981

[54] CONTROL OF A CRACKING FURNACE

[75] Inventors: Charles M. Stewart, Bartlesville, Okla.; Wilbur N. Killebrew, Jr., Phoenix, Ariz.

[73] Assignee: Phillips Petroleum Company, Bartlesville, Okla.

[21] Appl. No.: 35,196

[22] Filed: May 2, 1979

[51] Int. Cl.$^3$ .................. G06F 15/46; G06G 7/58
[52] U.S. Cl. ................. 364/501; 208/DIG. 1; 422/110; 585/501; 364/106; 364/116
[58] Field of Search ............ 364/500, 501, 502, 105, 364/106, 116, 118; 208/DIG. 1, 106, 132, 48 R, 48 Q; 422/62, 108–110; 585/501, 648, 650; 23/230 A

[56] References Cited

U.S. PATENT DOCUMENTS

| | | | |
|---|---|---|---|
| 3,175,968 | 3/1965 | Berger | 364/500 X |
| 3,473,008 | 10/1969 | Bay et al. | 364/116 X |
| 3,594,559 | 7/1971 | Pemberton | 364/500 |
| 3,619,360 | 11/1971 | Persik, Jr. | 364/116 X |
| 3,758,762 | 9/1973 | Littmann et al. | 364/116 |
| 3,824,388 | 7/1974 | Cugini | 364/500 |
| 3,828,171 | 8/1974 | Griffin | 364/501 |

Primary Examiner—Joseph F. Ruggiero

[57] ABSTRACT

The flow rate of a diluent fluid, such as steam, hydrogen or methane, to a cracking furnace is controlled so as to maintain a desired outlet velocity for the effluent flowing from the cracking furnace or to maintain a desired residence time for the feed stream in the cracking furnace. Feed forward control for the flow rate of the diluent fluid is provided by using an empirical model of the cracking furnace to predict either the outlet velocity or the residence time based on measured system parameters. Feedback control for the flow rate of the diluent fluid is provided by calculating the actual outlet velocity or actual residence time based on measured system parameters. The measured outlet velocity or residence time is utilized to bias or correct the predicted outlet velocity or residence time to provide a corrected prediction of the outlet or residence time. If control of the outlet velocity is desired, then the flow rate of the diluent fluid to the cracking furnace is manipulated in response to the corrected outlet velocity signal. If control of the residence time is desired, then the flow rate of the diluent fluid to the cracking furnace is controlled in response to the corrected residence time signal.

70 Claims, 3 Drawing Figures

CONTROL OF A CRACKING FURNACE

This invention relates to the control of a cracking furnace. In a particular aspect, this invention relates to method and apparatus for controlling the flow of a diluent fluid to a cracking furnace so as to maintain a desired outlet velocity for the effluent passing from the cracking furnace. In another particular aspect, this invention relates to method and apparatus for controlling the flow of a diluent fluid to a cracking furnace so as to maintain a desired residence time for the feed stream in the cracking furnace.

The cracking furnace forms the heart of many chemical manufacturing processes. Often the performance of the cracking furnace will carry the burden of the major profit potential of the entire manufacturing process. Close control of the cracking furnace is required to maintain a desired conversion rate in the cracking furnace and to prevent damage to the cracking furnace.

In a manufacturing process such as the manufacture of ethylene, feed gas such as ethane and/or propane and/or naphtha is fed into the cracking furnace. A diluent fluid such as steam is usually combined with the feed material being provided to the cracking furnace. Within the furnace, the feed stream which has been combined with the diluent fluid is converted to a gaseous mixture which primarily contains hydrogen, methane, ethylene, propylene, butadiene, and small amounts of heavier gases. At the furnace exit, this mixture is cooled, which allows removal of most of the heavier gases, and compressed.

The compressed mixture is routed through various distillation columns where the individual components such as ethylene are purified and separated. The separated products, of which ethylene is the major product, then leave the ethylene plant to be used in numerous other processes for the manufacture of a wide variety of secondary products.

The primary function of the cracking furnace is to convert the feed stream to ethylene and/or propylene. A semi-pure carbon which is termed "coke" is formed in the cracking furnace as a function of the furnace cracking operation. The amount of coke formed in the cracking furnace is a function of the length of time, known as "residence time," that the mixture of feed gas and diluent fluid is in the cracking furnace undergoing reaction or is a function of the outlet velocity of the effluent flowing from the cracking furnace. This coke adheres to the inner walls of the furnace cracking tubes and transfer line heat exchangers and additionally accumulates in the entrance head of the heat exchangers. Coke build-up eventually causes the furnace's removal from service by plugging the furnace or heat exchanger tubes.

It is desirable to control the residence time or outlet velocity so as to enhance the conversion of the feed gas to ethylene or propylene while substantially minimizing the formation of coke in the cracking furnace. It is thus an object of this invention to provide method and apparatus for controlling the flow of a diluent fluid to a cracking furnace so as to maintain a desired velocity for the effluent passing from the cracking furnace. It is another object of this invention to provide method and apparatus for controlling the flow of a diluent fluid to a cracking furnace so as to maintain a desired residence time for the feed stream in the cracking furnace.

In accordance with the present invention, method and apparatus are provided whereby measurements of the flow rate of the feed material and the diluent fluid being provided to the cracking furnace, an analysis of the feed material, and the temperature and pressure at the outlet of the cracking furnace are utilized to predict an analysis of the gaseous mixture flowing from the cracking furnace. The molecular weight of the gaseous mixture flowing from the cracking furnace is calculated based on the predicted analysis and this predicted molecular weight it utilized to calculate a predicted outlet velocity based on equations derived from the ideal gas laws. The prediction of the actual outlet velocity for the gaseous mixture flowing from the cracking furnace is corrected as necessary by a comparison of the predicted outlet velocity with the actual measured outlet velocity of the gaseous mixture flowing from the cracking furnace. The corrected prediction of the outlet velocity is compared to a desired outlet velocity to determine the flow rate of the diluent fluid to the cracking furnace required to maintain the desired outlet velocity. A signal representative of the flow rate of the diluent fluid required to maintain a desired outlet velocity is utilized to manipulate the flow rate of diluent fluid to the cracking furnace to thereby maintain the outlet velocity of the gaseous mixture flowing from the cracking furnace at a desired level.

If control based on the desired residence time of the mixture of the feed material and diluent fluid in the cracking furnace is desired, measurements of the flow rate of the feed material and the diluent fluid being provided to the cracking furnace, an analysis of the feed material, and the temperature and pressure at the outlet of the cracking furnace are again utilized to predict the analysis of the gaseous mixture flowing from the cracking furnace. The molecular weight of the gaseous mixture flowing from the cracking furnace is calculated based on the predicted analysis. The predicted molecular weight is utilized to calculate a predicted residence time for the mixture of the feed material and diluent fluid in the cracking furnace based on equations derived from the ideal gas laws. The prediction of the actual residence time for the material being cracked in the cracking furnace is corrected as necessary by a comparison of the predicted residence time with the actual measured residence time for the material being cracked in the cracking furnace. The corrected prediction of the residence time is compared to a desired residence time to determine the flow rate of the diluent fluid required to maintain the desired residence time. A signal representative of the flow rate of the diluent fluid required to maintain a desired residence time is utilized to manipulate the flow rate of the diluent fluid to the cracking furnace to thereby maintain a desired residence time in the cracking furnace.

Other objects and advantages of the invention will be apparent from the description of the invention and the appended claims as well as from the detailed description of the drawings in which:

Figure 1:
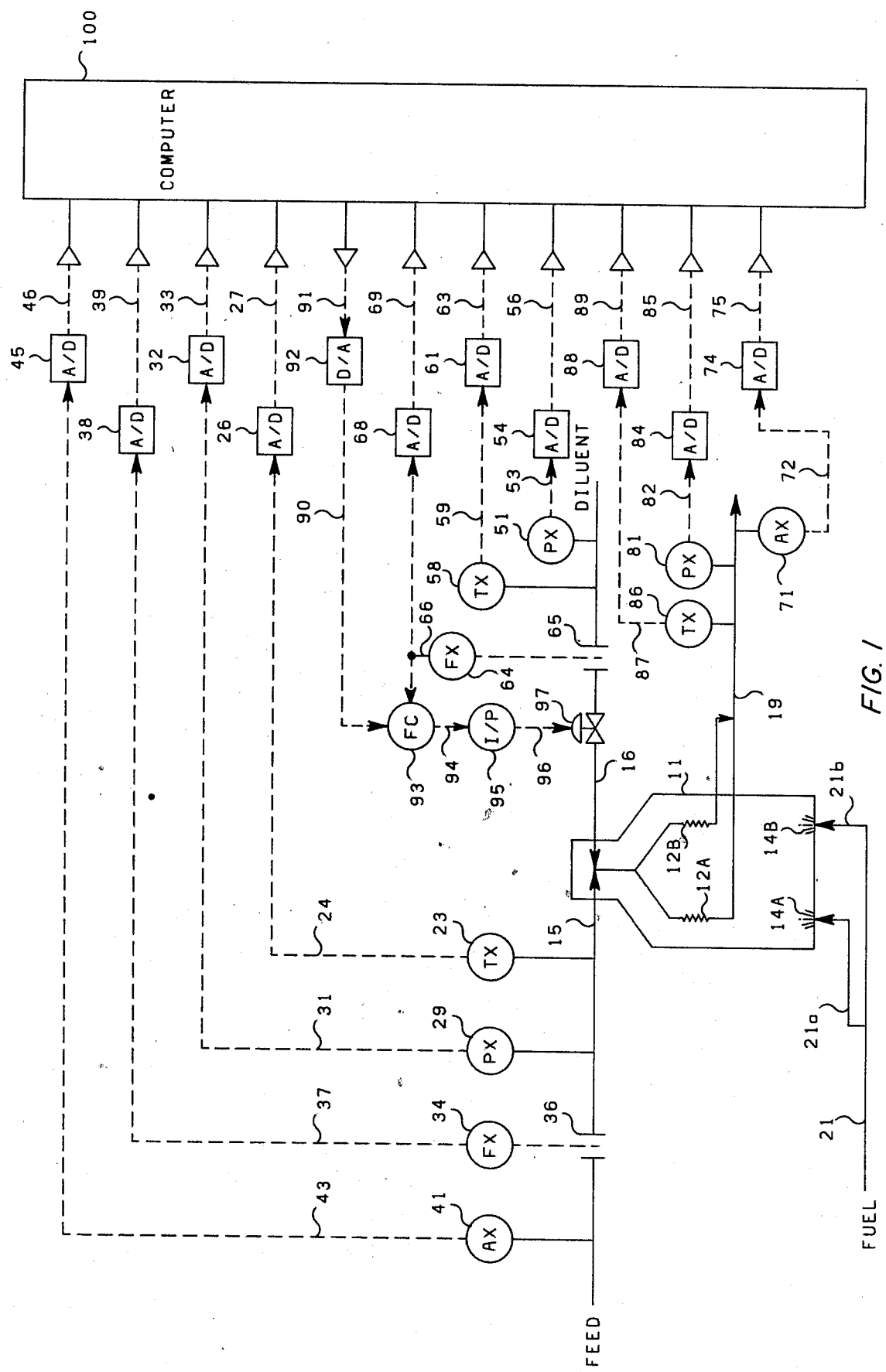
FIG. 1 is a schematic diagram of a cracking furnace with an associated control system.

For the sake of simplicity the invention is illustrated and described in terms of a single cracking furnace having only two burners and heating sections. However, the invention is also applicable to multiple furnaces and is applicable to furnaces having only one burner and heating section or a plurality of burners and heating sections.

The invention is also illustrated and described in terms of a process for the manufacture of ethylene. However, the applicability of the invention described herein extends to other processes wherein a cracking furnace is utilized to crack a feed material into some desired components. A specific control configuration is set forth in FIG. 1 for the sake of illustration. However, the invention extends to different types of control system configurations which accomplish the purpose of the invention. Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of any other type of signal transmission, compatible with the process and equipment in use, is within the scope of the invention.

Both the analog and digital controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E \, dt$$

where
S = output control signals;
E = difference between two input signals; and
$K_1$ and $K_2$ = constants.

The scaling of an output signal by a controller is well known in control system art. Essentially, the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 0 to 10 volts, which is typical, then the output could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented utilizing electrical analog, digital electronic, pneumatic, hydraulic, mechanical or other similar types of equipment or combinations of the invention preferably utilizes a combination of pneumatic control elements, electrical analog signal handling and translation apparatus, and a digital computer, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other measuring instruments may produce a signal which bears a more complicated, but known, relationship to the measured parameter. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, a conventional cracking furnace 11 is illustrated having two cracking tubes 12a and 12b. Heat is supplied to the two cracking tubes 12a and 12b by means of burners 14a and 14b respectively. As has been previously stated, the cracking furnace 11 is illustrated as having only two burners and two cracking tubes for the sake of convenience. Ordinarily a cracking furnace used in a process such as the manufacture of ethylene will have a larger number of cracking tubes and burners. Also in a process such as the manufacture of ethylene a plurality of cracking furnaces will commonly be utilized.

A feedstock such as ethane and/or propane and/or naphtha is provided as a feed to the cracking furnace 11 through conduit means 15. Steam is provided to the cracking furnace 11 through conduit means 16. The feed flowing through conduit means 15 and the steam flowing through conduit means 16 are combined within the cracking furnace 11 and flow through the cracking tubes 12a and 12b. After passing through the cracking tubes 12a and 12b in which the feed is converted to ethylene, propylene and other gases, the gaseous mixture is combined and flows to various distillation columns through conduit means 19.

Fuel is supplied to the cracking furnace 11 through conduit means 21. Specifically fuel is supplied to burner 14a through conduit means 21a which is operably connected to conduit means 21. Fuel is supplied to burner 14b through conduit means 21b which is also operably connected to conduit means 21.

The cracking furnace described in this point is a conventional cracking furnace system. It is the manner in which the cracking furnace, illustrated in FIG. 1, is controlled so as to maintain a desired outlet velocity or residence time which provides the novel features of the present invention.

Temperature transducer 23 provides a signal 24 which is representative of the temperature of the feed flowing through conduit means 15. Signal 24 is provided from the temperature transducer 23 to the analog-to-digital (A/D) converter 26. The A/D converter 26 converts signal 24 to digital form and provides signal 27, representative of the temperature of the feed flowing through conduit means 15, to computer means 100. The pressure transducer 29 provides a signal 31 representative of the pressure of the feed flowing through conduit means 15. Signal 31 is provided from the pressure transducer 29 to the A/D converter 32. The A/D converter 32 converts signal 31 to digital form and provides a signal 33, representative of the pressure of the feed flowing through conduit means 15, to computer means 100. Flow transducer 34 in combination with flow sensor 36, which is operably located in conduit means 15, provides an output signal 37 which is representative of the volume flow rate of the feed gas flowing through conduit means 15. Signal 37 is provided from the flow transducer 34 to the A/D converter 38. The A/D converter 38 converts signal 37 to digital form and provides signal 39, representative of the volume flow rate of the feed flowing through conduit means 15 to computer means 100. Analyzer transducer 41, which is preferably a chromatographic analyzer, provides a plurality of output signals which are represented as signal 43. The plurality of output signals, of which signal 43 is representative, are representative of the mol percents of each component in the feedstream flowing through conduit means 15. The specific components analyzed for are hydrogen, methane, ethylene, ethane, propylene, propane, butane, pentane plus, acetylene, propadiene, butadiene and butene. The plurality of signals, of which signal 43 is representative, are provided from the analyzer transducer 41 to a plurality of A/D converters of which A/D converter 45 is representative. The plurality of signals, of which signal 43 is representative, are converted to digital form by the plurality of A/D converters, of which the A/D converter 45 is representative, and are provided as a plurality of signals, of which signal 46 is representative, to the computer means 100.

Pressure transducer 51 provides an output signal 53 representative of the pressure of the steam flowing through conduit means 16. Signal 53 is provided from the pressure transducer 51 to the A/D converter 54. Signal 53 is converted to digital form by the A/D converter 54 and is provided as signal 56 to computer means 100. The temperature transducer 58 provides an output signal 59 representative of the temperature of the steam flowing through conduit means 16. Signal 59 is provided from the temperature transducer 58 to the A/D converter 61. Signal 59 is converted to digital form by the A/D converter 61 and is provided as signal 63 to the computer means 100. The flow transducer 64 in combination with the flow sensor 65, which is operably located in conduit means 16, provides an output signal 66 which is representative of the volume flow rate of the steam flowing through conduit means 16. Signal 66 is provided from the flow transducer 64 to the A/D converter 68. Signal 66 is converted to digital form by the A/D converter 68 and is provided as signal 69 to the computer means 100.

Analyzer transducer 71, which is preferably a chromatographic analyzer, provides a plurality of output signals of which signal 72 is representative. The plurality of signals, of which signal 72 is representative, are representative of the mol percent of various components in the effluent flowing through conduit means 19. Specific components analyzed for are again hydrogen, methane, ethylene, ethane, propylene, propane, butane, pentane plus, acetylene, propadiene, butadiene and butene. The plurality of signals, of which signal 72 is representative, are provided to a plurality of A/D converters of which A/D converter 74 is representative. The plurality of signals, of which signal 72 is representative, are converted to digital form by the plurality of A/D converters, of which A/D converter 74 is representative, and are provided as a plurality of signals, of which signal 75 is representative, to the computer means 100. Pressure transducer 81 provides an output signal 82 which is representative of the pressure of the gaseous mixture flowing through conduit means 19. Signal 82 is provided from the pressure transducer 81 to the A/D converter 84. Signal 82 is converted to digital form by the A/D converter 84 and is provided as signal 85 to computer means 100. The temperature transducer 86 provides an output signal 87 which is representative of the temperature of the gaseous mixture flowing through conduit means 19. Signal 87 is provided from the temperature transducer 86 as an input to the A/D converter 88. Signal 87 is converted to digital form by the A/D converter 88 and is provided as signal 89 to computer means 100.

In response to the described input signals, the computer means 100 generates a control signal 91 which is representative of the volume flow rate of the steam flowing through conduit means 16 required to maintain either a desired outlet velocity for the cracking furnace 11 or to maintain a desired residence time for the cracking furnace 11. Signal 91 is provided from computer means 100 to the digital to analog (D/A) converter 92. Signal 91 is converted to analog form by the D/A converter 92 and is provided as signal 90 to the flow controller 93. The flow controller 93 is also provided with signal 66, representative of the actual volume flow rate of the steam flowing through conduit means 16, from the flow transducer 64. The flow controller 93 compares signal 66 and signal 90 and outputs a signal 94, which is responsive to the difference between signal 66 and signal 90. Signal 94 is converted to pneumatic form by the current to the pneumatic transducer 95 and is provided as signal 96 to the pneumatic control valve 97. The pneumatic control valve 97 is operably located in conduit means 16. The pneumatic control valve 97 is manipulated in response to signal 96 to thereby control the flow of steam through conduit means 16 to provide either a desired outlet velocity for the gaseous mixture flowing from the cracking furnace 11 or to provide a desired residence time for the feed mixture and steam in the cracking furnace 11.

Figure 2:
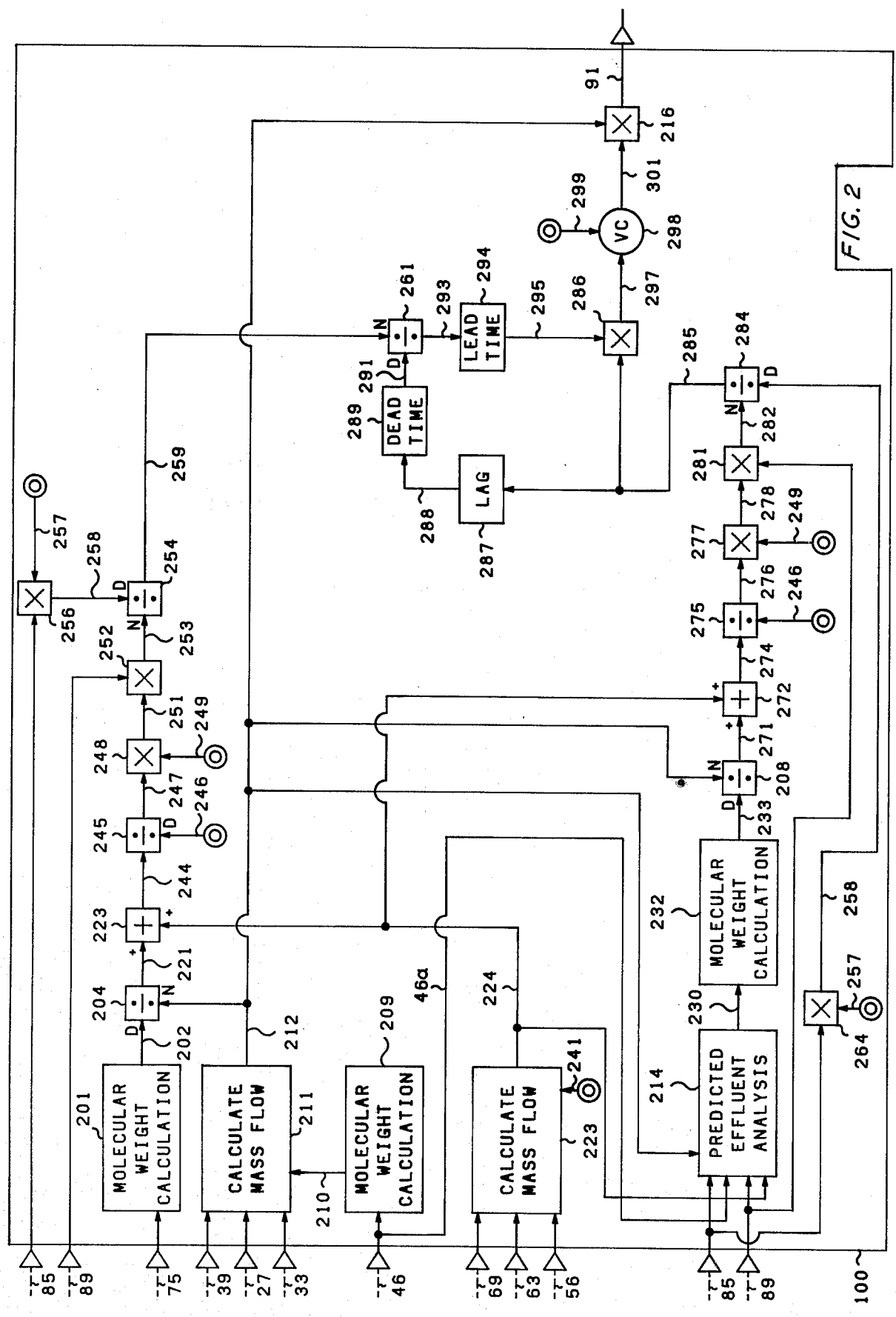
FIG. 2 is a logic diagram for the computer logic utilized to generate the control signals utilized in the control of the outlet velocity for the cracking furnace illustrated in FIG. 1.

The following development of the control signal 91, where control signal 91 is representative of the flow rate of the steam required to maintain a desired outlet velocity for the cracking furnace 11, is provided to clarify the logic flow diagram illustrated in FIG. 2. The P-V-T relationship for a gas is given by the well known ideal gas law equation:

(1) $PV = NRT$ where $V$ = volume of N mols of gas;
P = absolute pressure;
T = absolute temperature;
R = a universal constant whose value depends on the units used; and
N equals number of mols of gas.

The volume of a gas flowing through an outlet per unit time may be determined by multiplying the cross-sectional area of the outlet by the velicity of the gas. If V is then defined as the velocity of the gas flowing out of the cracking furnace 11 multiplied by the cross-sectional area of the cracking tubes 12a and 12b and N is defined as the number of mols of gas per second flowing out of the cracking furnace 11, then Equation (I) may be rearranged to give:

(II) Velocity = NRT/AP where A = the cross-sectional area of the cracking tubes 12A and 12B,
N = number of mols of gas flowing from the cracking furnace 11 per second;
T = absolute temperature of the effluent flowing out of the cracking furnace 11;
P = absolute pressure of the effluent flowing out of the cracking furnace 11; and
R is as previously defined.

The number of moles of gas flowing out of the cracking furnace 11 per unit time can be determined by the equation $$TMF = F_R/\text{EFF. MOL. WT.} + S_R/18.015 \quad \text{(III)}$$

where
TMF = total mole flow rate;
$F_R$ = flow rate of feed mixture into the cracking furnace 11;
EFF·MOL·WT· = molecular weight of the hydrocarbons in the effluent;
$S_R$ = flow rate of steam into the cracking furnace 11; and
18.015 = molecular weight of the steam.

Since the flows are commonly measured in lbs/hr, TMF is commonly divided by 3600 sec/hr to give N.

The actual outlet velocity for the cracking furnace 11 may thus be calculated utilizing Equation (II). FIG. 2 is an illustration of a digital implementation for a solution of Equation (II) based on the described inputs to computer means 100. Equation (II) is solved to yield signal 91, which is representative of the flow rate of the steam required to maintain the desired outlet velocity for the cracking furnace 11.

The logic flow diagram utilized to calculate the control signal 91 in response to the previously described input signals to computer means 100 is illustrated in FIG. 2. Symbols previously described and defined in the development of Equation (II) are utilized in the description of FIG. 2. Many of the measurement signals illustrated in FIG. 1 are utilized more than once in the computer logic illustrated in FIG. 2. However, the signals have been separated and the same number have been utilized to identify identical signals to avoid the confusion of numerous crossing lines.

The logic flow diagram utilized to calculate the control signal 91 in response to the previously described input signals to the computer means 100 is illustrated in FIG. 2. Referring now to FIG. 2, signal 75 which is representative of the plurality of signals provided by the analyzer transducer 71, illustrated in FIG. 1, is provided as an input to the molecular weight calculation block 201. In the molecular weight calculation block 201, the mol percent of each hydrocarbon component in the effluent from the cracking furnace 11 is multiplied by the molecular weight of each respective hydrocarbon component. The molecular weights of each hydrocarbon component, multiplied by the mol percent of each hydrocarbon component, is then summed to provide signal 202 which is representative of the molecular weight of the hydrocarbon portion of the effluent flowing from the cracking furnace 11 (EFF·MOL·WT.). Equation (IV) is utilized in the molecular weight calculation to provide signal 202.

$$MW_T = \sum_{i = \text{Hydrogen}}^{\text{Butene}} \text{Mol } \%_i * \text{Mol Weight}_i \quad \text{(IV)}$$

where
$MW_T$ = total molecular weight of hydrocarbon portion of the effluent flowing from the cracking furnace 11;
Mol $\%_i$ = mol % of a specific component in the effluent;
Mol Weight$_i$ = molecular weight of a specific component in the effluent; and
i = the particular constituent in the effluent (hydrogen, methane, ethylene, ethane, propylene, propane, butane, pentane plus, acetylene, propadiene, butadiene, and butene).

Signal 202 is provided from the molecular weight calculation block 201 as a first input to the dividing block 204.

Signal 46, which is representative of the plurality of signals which are provided from the analyzer transducer 41, illustrated in FIG. 1, is provided as an input to the molecular weight calculation block 209. The mol percent of each constituent is multiplied by the molecular weight of each constituent and the results are summed in the molecular weight calculation block 209 to provide signal 210 which is representative of the molecular weight of the feedstream. Equation (V) is utilized in the molecular weight calculation to provide signal 210.

$$MW_F = \sum_{i = \text{Hydrogen}}^{\text{Butene}} \text{Mol } \%_i * MW_i \quad \text{(V)}$$

where
$MW_F$ = molecular weight of the feedstream;
Mol $\%_i$ = mol % of a specific embodiment in the feedstream;
$MW_i$ = molecular weight of a specific component in the feedstream; and
i is the particular constituent in the feedstream (hydrogen, methane, ethylene, ethane, propylene, propane, butane, pentane plus, acetylene, propadiene, butadiene, and butene).

Signal 210 is provided from the molecular weight calculation block 209 as an input to the calculated mass flow block 211.

Signals 39, 27 and 33, which are respectively representative of the flow rate, temperature and pressure of the feedstream flowing to the cracking furnace 11, are also provided as inputs to the calculate mass flow block 211. Signals 210, 39, 27 and 33 are utilized to calculate the mass flow rate of the feedstream utilizing equation (VI).

$$F_R = F_{MEAS} \cdot \sqrt{\frac{P_{MEAS} \cdot MW_F}{T_{MEAS}}} \qquad (VI)$$

where
$F_R$ = mass flow rate;
$F_{MEAS}$ = measured flow signal;
$T_{MEAS}$ = measured temperature;
$T_{MEAS}$ = measured pressure; and
$MW_F$ = the molecular weight of the feedstream.

Signal 212 which is representative of the flow rate of the feedstream at standard conditions ($F_R$) is provided from the calculate flow at standard conditions block 211 as a second input to the dividing block 204, an input to the predicted effluent analysis block 214, an input to the dividing block 208 and as an input to the multiplying block 216.

Signal 212 is divided by signal 202 in the dividing block 204 to yield signal 221, which is representative of the total number of mols of the cracked feed mixture which is flowing out of the cracking furnace 11 per hour ($F_R$/EFF·MOL·WT·). Signal 221 is provided from the dividing block 204 as a first input to the summing block 223.

Signals 69, 63 and 56, which are respectively representative of the flow rate, temperature and pressure of the steam flowing through conduit means 16, are provided as inputs to the calculate mass flow block 223. The calculate mass flow block 231 is also supplied with the set point signal 241, which is representative of the molecular weight of steam (18.015). Equation (VI) is utilized in the calculate mass flow block 223 to provide signal 224 which is representative of the mass flow rate of the steam flowing through conduit means 15 ($S_R$). The parameters of Equation (VI) are changed for the steam rather than the feed. Signal 224 is provided from the calculate mass flow block 223 as an input to the predicted effluent analysis block 214 and as an input to the summing block 223.

Signals 221 and 242 are summed in the summing block 223 to provide signal 244, which is representative of the total number of mols of gas flowing from the cracking furnace 11 per hour TMF. Signal 244 is provided from the summing block 223 as a first input to the dividing block 245. The dividing block 245 is provided with a set point signal 246 which is representative of the number of second in an hour (3600). Signal 244 is divided by signal 246 in the dividing block 245 to provide signal 247, which is representative of the total number of mols of gas flowing from the cracking furnace 11 per second (N). Signal 247 is provided from the dividing block 245 as a first input to the multiplying block 248. The multiplying block 248 is provided with a set point signal 249 which is representative of the gas constant R[(10.73 (psia) (ft$^3$)/(lb mole) (°R)]. Signal 247 is multiplied by signal 249 in the multiplying block 248 to provide signal 251, which is representative of NR. Signal 251 is provided from the multiplying block 248 as a first input to the multiplying block 252. The multiplying block 252 is provided with signal 89, which is representative of the temperature of the effluent flowing from the cracking furnace 11 (T), as a second input. Signal 251 is multiplied by signal 89 in the multiplying block 252 to provide signal 253, which is representative of NRT. Signal 253 is provided from the multiplying block 252 as a first input to dividing block 254.

Signal 85, which is representative of the pressure of the effluent flowing from the cracking furnace 11 (P) is provided as a first input to the multiplying block 256. The multiplying block 256 is also provided with the set point signal 257, which is representative of the total cross-sectional area of the cracking tubes 12$a$ and 12$b$ (A). Signal 85 is multiplied by signal 257 in the multiplying block 256 to provide signal 258, which is representative of AP. Signal 258 is provided from the multiplying block 256 as a second input to the dividing block 254. Signal 253 is divided by signal 258 to provide signal 259, which is representative of the measured outlet velocity for the cracking furnace 11 (velocity). Signal 259 is provided from the dividing block 254 as a first input to the dividing block 261.

Signal 46$a$ is one of the pluralities of signals which is represented by signal 46. Signal 46$a$ is representative of either the mol percent of ethane or propane in the feed flowing to the cracking furnace 11, depending on whether the cracking furnace 11 is being controlled so as to provide a desired percent conversion of ethane or a desired percent conversion of propane. Signal 46$a$ is provided as an input to the predicted effluent analysis block 214.

The predicted effluent analysis block 214 is also provided with signals 89 and 85 which are respectively representative of the temperature and pressure of the effluent flowing through conduit means 19 from the cracking furnace 11. Equations (VII–XVII) are utilized to calculate a predicted effluent analysis in response to signals 46$a$, 212, 89, 85 and 224.

$$\begin{aligned}\text{MOL \%}_{HYDROGEN} = & (K_1)(T)(MF_E) - (K_2)(MF_E) \\ & - (K_3)(F_R)(MF_E) - (K_4)(S_R) + K_5(P)(MF_E) + K_6\end{aligned} \qquad (VII)$$

where
MOL %$_{HYDROGEN}$ = mol percent hydrogen in the effluent;
$F_R$ = mass flow rate of feed;
$S_R$ = mass flow rate of steam;
T = temperature of the effluent
P = pressure of the effluent
$MF_E$ = mol fraction of ethane or propane in feed = mol percent of ethane or propane in feed divided by 100; and
$K_1 - K_6$ = constants.

$$\begin{aligned}\text{MOL \%}_{METHANE} = & (K_7)(MF_E) + K_8(T) + K_9(P) - (K_{10})(F_R) - K_{11}\end{aligned} \qquad (VIII)$$

where
MOL %$_{METHANE}$ = mol percent of methane in the effluent;
$K_7 - K_{11}$ = constants; and
$MF_E$, T, P, and $F_R$ are as previously defined.

$$\begin{aligned}\text{MOL \%}_{ETHYLENE} = & (K_{12})(T) + (K_{13})(T)(MF_E) \\ & - (K_{14})(F_R)(MF_E) - K_{15}(S_R)(MF_E) + (K_{16})(P)(MF_E) \\ & - (K_{17})(MF_E) - K_{18}\end{aligned} \qquad (IX)$$

where
MOL %$_{ETHYLENE}$ = mol percent of ethylene in the effluent;
$K_{12} - K_{18}$ = constants; and
$MF_E$, T, $F_R$, $S_R$ and P are as previously defined.

$$\text{MOL \%}_{ETHANE} = (K_{19})(F_R)(MF_E) - (K_{20})(T) + \quad (X)$$
$$(K_{21})(S_R)(MF_E) - (K_{22})(P) + K_{23}$$

where

MOL $\%_{ETHANE}$ = mol percent of ethane in the effluent;

$K_{19} - K_{23}$ = constants; and $F_R$, $S_R$, T, P and $MF_E$ are as previously defined.

$$\text{MOL \%}_{PROPYLENE} = -(K_{24})(T)(MF_E) + K_{25} \quad (XI)$$

where

MOL $\%_{PROPYLENE}$ = mol percent of propylene in the effluent;

$K_{24}$ and $K_{25}$ = constants; and

T and $MF_E$ are as previously defined.

$$\text{MOL \%}_{PROPANE} + (K_{26})(T)(MF_E) - (K_{27})(T) - \quad (II)$$
$$(K_{28})(MF_E) + (K_{29})(S_R) - (K_{30})(S_R)(MF_E) +$$
$$(K_{31})(F_R) - (K_{32})(F_R)(MF_E) - (K_{33})(P) +$$
$$K_{34}(P)(MF_E) + K_{35}$$

where

MOL $\%_{PROPANE}$ = mol percent of propane in the effluent;

$K_{26} - K_{35}$ = constants; and $F_R$, $S_R$, T, P and $MF_E$ are as previously defined.

$$\text{MOL \%}_{BUTANE} = -(K_{36})(T) + (K_{37})(F_R)(MF_E) + \quad (II)$$
$$(K_{38})(S_R) - (K_{39})(P) + (K_{40})(P)(MF_E) -$$
$$(K_{41})(S_R)(MF_E) + K_{42}$$

where

MOL $\%_{BUTANE}$ = mol percent of butane in the effluent;

$K_{36} - K_{42}$ = constants; and

T, $F_R$, $S_R$, P and $MF_E$ are as previously defined.

$$\text{MOL \%}_{PENTANE\ PLUS} = (K_{43})(MF_E) + (K_{44})(T) + \quad (XIV)$$
$$(K_{45})(P) - (K_{46})(S_R) - (K_{47})(F_R) +$$
$$(K_{48})(S_R)(MF_E) + (K_{49})(F_R)(MF_E) +$$
$$(K_{50})(P)(MF_E) - (K_{51})(T)(MF_E) - K_{52}$$

where

MOL $\%_{PENTANE\ PLUS}$ = mol percent of pentane plus in effluent;

$K_{43} - K_{52}$ = constants; and $F_R$, $S_R$, T, P and $MF_E$ are as previously defined.

$$\text{MOL \%}_{ACETYLENE} = -(K_{53})(MF_E) + (K_{54})(T)(MF_E) - \quad (XV)$$
$$(K_{55})(P)(MF_E) - (K_{56})(F_R) + (K_{57})(S_R)(MF_E) + K_{58}$$

where

MOL $\%_{ACETYLENE}$ = mol percentage of acetylene in effluent;

$K_{53} - K_{58}$ = constants; and $F_R$, $S_R$, T, P and $MF_E$ are as previously defined.

$$\text{MOL \%}_{PROPALENE} = -(K_{59})(S_R) - (K_{60})(S_R)(MF_E) = \quad (XVI)$$
$$(K_{61})(F_R) - (K_{62})(F_R)(MF_E) + (K_{63})(T)(MF_E) - K_{64}$$

where

MOL $\%_{PROPADIENE}$ = mol percentage of propydiene in effluent;

$K_{59} - K_{64}$ = constants; and $F_R$, $S_R$, T and $MF_E$ are as previously defined.

$$\text{MOL \%}_{BUTADIENE} = (K_{65})(MF_E) + (K_{66})(T) + \quad (XVII)$$
$$(K_{67})(D)(MF_E) - (K_{68})(S_R)(MF_E) -$$
$$(K_{69})(F_R)(MF_E) - (K_{70})(P) - K_{71}$$

where

MOL $\%_{BUTADIENE}$ = mol percentage of butadiene in effluent;

$K_{65} - K_{71}$ = constants; and $F_R$, $S_R$, T, P and $MF_E$ are as previously defined.

$$\text{MOL \%}_{BUTENE} = (K_{72})(T)(MF_E) - (K_{73})(T) - \quad (XVIII)$$
$$(K_{74})(MF_E) + (K_{75})(F_R)(MF_E) - (K_{76})(F_R) + K_{77}$$

where

MOL $\%_{BUTENE}$ = mol percentage of butene in effluent;

$K_{72} - K_{77}$ = constants; and $F_R$, T and $MF_E$ are as previously defined.

Equations (II)–(XVIII) may be developed by operating the cracking furnace 11 under different operating conditions with the feed rate of the feed mixture and the steam as well as the temperature and pressure of the effluent being varied to give different product distribution curves as a function of the process variables. A curve fitting routine such as the well known linear regression routine is then utilized to develop equations (VII)–(XVIII) as a function of the product distribution curves. A list of the preferred values for the constants $K_1$–$K_{77}$ follows. These constants were calculated using product distribution curves and the linear regression curve fitting routine.

$K_1 = 0.21259126 \times 10^{10-2}$
$K_2 = 0.29351340 \times 10^1$
$K_3 = 0.16282686 \times 10^{-5}$
$K_4 = 0.10071834 \times 10^{-5}$
$K_5 = 0.16302736 \times 10^{-2}$
$K_6 = 0.15576788 \times 10^0$
$K_7 = 0.35028952 \times 10^0$
$K_8 = 0.58373493 \times 10^{-3}$
$K_9 = 0.16723605 \times 10^{-2}$
$K_{10} = 0.86043901 \times 10^{-6}$
$K_{11} = 0.48793581 \times 10^0$
$K_{12} = 0.66539914 \times 10^{-3}$
$K_{13} = 0.85403390 \times 10^{-3}$
$K_{14} = 0.12875953 \times 10^{-5}$
$K_{15} = 0.65168998 \times 10^{-6}$
$K_{16} = 0.61665419 \times 10^{-3}$
$K_{17} = 0.11733123 \times 10^1$
$K_{18} = 0.72769346 \times 10^0$
$K_{19} = 0.37129993 \times 10^{-5}$
$K_{20} = 0.36132675 \times 10^{-2}$
$K_{21} = 0.28329856 \times 10^{-5}$
$K_{22} = 0.35611414 \times 10^{-2}$
$K_{23} = 0.55168078 \times 10^1$
$K_{24} = 0.50564036 \times 10^{-4}$
$K_{25} = 0.08137489 \times 10^0$
$K_{26} = 0.14820059 \times 10^{-2}$
$K_{27} = 0.14924916 \times 10{-2}$
$K_{28} = 0.22170964 \times 10^1$
$K_{29} = 0.12817241 \times 10^{-5}$
$K_{30} = 0.12753332 \times 10^{-5}$
$K_{31} = 0.12000062 \times 10^{-5}$
$K_{32} = 0.12730826 \times 10^{-5}$
$K_{33} = 0.19165640 \times 10^{-2}$
$K_{34} = 0.19085632 \times 10^{-2}$
$K_{35} = 0.223321836 \times 10^1$
$K_{36} = 0.1073742 \times 10^{-4}$
$K_{37} = 0.74468893 \times 10^{-8}$
$K_{38} = 0.19003633 \times 10^{-7}$
$K_{39} = 0.46845416 \times 10^{-4}$
$K_{40} = 0.46659562 \times 10{-4}$
$K_{41} = 0.17271431 \times 10^{-7}$
$K_{42} = 0.01632812 \times 10^0$
$K_{43} = 0.1439295 \times 10^0$
$K_{44} = 0.22350828 \times 10^{-3}$
$K_{45} = 0.69028225 \times 10^{-3}$ $K_{46} = 0.51321728 \times 10^{-6}$
$K_{47} = 0.41024511 \times 10^{-6}$
$K_{48} = 0.41307237 \times 10^{-6}$
$K_{49} = 0.34371381 \times 10^{-6}$
$K_{50} = 0.48382731 \times 10^{-3}$
$K_{51} = 0.12083100 \times 10^{-3}$
$K_{52} = 0.29184742 \times 10^{0}$
$K_{53} = 0.58333295 \times 10^{-1}$
$K_{54} = 0.36603266 \times 10^{-4}$
$K_{55} = 0.61899691 \times 10^{-4}$
$K_{56} = 0.23057016 \times 10^{-7}$
$K_{57} = 0.18947647 \times 10^{-7}$
$K_{58} = 0.00648064 \times 10^{0}$
$K_{59} = 0.20740699 \times 10^{-6}$
$K_{60} = 0.21523933 \times 10^{-6}$
$K_{61} = 0.16970365 \times 10^{-6}$
$K_{62} = 0.17487865 \times 10^{-6}$
$K_{63} = 0.53656107 \times 10^{-5}$
$K_{64} = 0.58224914 \times 10^{-2}$
$K_{66} = 0.69485969 \times 10^{-4}$
$K_{76} = 0.20485346 \times 13$
$K_{68} = 0.63454670 \times 10^{-7}$
$K_{69} = 0.57621877 > 10^{-7}$
$K_{70} = 0.77964798 \times 10^{-4}$
$K_{71} = 0.092251 \times 10^{0}$
$K_{72} = 0.80100702 \times 10^{-4}$
$K_{73} = 0.79600759 \times 10^{-4}$
$K_{74} = 0.12733318 \times 10^{0}$
$K_{75} = 0.33257102 \times 10^{-7}$
$K_{76} = 0.24775105 \times 10^{-7}$
$K_{77} = 0.12697 \times 10^{0}$ The results of equations (VII)-(XVIII) are provided as a plurality of output signals, of which signal 230 is representative, to the molecular weight calculation block 232. The plurality of signals, which are represented by signal 230, are utilized to calculate the predicted molecular weight of the hydrocarbon portion of the effluent flowing from the cracking furnace 11 in the same manner as previously described for the molecular weight calculation block 201 utilizing equation (IV). Signal 233 which is representative of the molecular weight of the hydrocarbon portion of the effluent flowing from the cracking furnace 11 (EFF. MOL. WT.) is provided as an input from the molecular weight calculation block 232 to the dividing block 208.

Signal 212 is divided by signal 233 in the dividing block 208 to provide signal 271 which is representative of the number of moles of the feed gas which has been cracked flowing from the cracking furnace 11 per second ($F_R$/EFF. MOL. WT). Signal 271 is provided from the dividing block 208 as the first input to the summing block 272. Signal 271 is summed with signal 242 in the summing block 272 to provide signal 274 which is representative of the total number of moles of gas flowing out of the cracking furnace 11 per hourr (TMF). Signal 274 is provided from the summing block 272 as a first input to the dividing block 275. The dividing block 275 is provided with a set point signal 246 which is representative of the number of seconds in an hour (3600). Signal 274 is divided by signal 246 in the dividing block 275 to provide signal 276, which is representative of the total number of mols of gas flowing from the cracking furnace 11 per second (N). Signal 276 is provided from the dividing block 275 as a first input to the multiplying block 277. The multiplying block 277 is provided with a set point signal 249 which is representative of the gas constant R[(10.73) (psia) (ft³)/(lb. mole) (°R.). Signal 276 is multiplied by signal 249 in the multiplying block 277 to provide signal 278, which is representative of NR. Signal 278 is provided from the multiplying block 277 as a first input to the multiplying block 281. The multiplying block 281 is provided with signal 89, which is representative of the temperature of the effluent flowing from the cracking furnace 11 (T), as a second input. Signal 278 is multiplied by signal 89 in the multiplying block 281 to provide signal 282, which is representative of NRT. Signal 282 is provided from the multiplying block 281 as a first input to dividing block 284.

Signal 85, which is representative of the pressure of the effluent flowing from the cranking furnace 11 (P), is provided as a first input to the multiplying block 264. The multiplying block 264 is also provided with the set point signal 257, which is representative of the tota. cross-sectional area of the cranking tubes 12a and 12b (A). Signal 85 is multiplied by signal 257 in the multiplying block 264 to provide signal 258, which is representative of AP. Signal 258 is provided from the multiplying block 264 as a second input to the dividing block 284. Signal 282 is divided by signal 258 to provide signal 285, which is representative of the measured outlet velocity for the cracking furnace 11. Signal 285 is provided as an input to the multiplying block 286 and as an input to the lag block 287.

The lag block 287 is a delay which is equal to the time required for a change in the flow rate of the steam flowing through conduit means 16 to the cracking furnace 11 to cause a change in the outlet velocity for the cracking furnace 11. The output signal 288 from lag block 287 is provided to the dead time block 289. The dead time block 289 is a delay representative of the furnace effluent chromatographic analyzer sample times. The dead time delay represented by the dead time block 289 would typically be on the order of 30 minutes. Signal 291 from the dead time block 289 is thus representative of the predicted outlet velocity delayed so as to compensate for propagation delays through the cracking furnace 11 and to compensate for the chromatographic analyzer sample time. Signal 291 is provided from the dead time block 289 as an input to the dividing block 261.

Signal 259 is divided by signal 291 in the dividing block 261 to establish signal 293. Signal 293 is provided from the dividing block 261 to the lead time block 294.

The lead time block 294 is essentially utilized as a trend predicting device. Thus, if the flow rate of steam to the cracking furnace 11 has been decreasing over a period of time the lead time block 294 is utilized to analyze this trend and provide predictive control which parallels a trend. In response to signal 293 the lead time block 294 provides an output signal 295 utilizing equation (XIX).

$$Y = X + \left( \frac{LT}{S_i} \right)(X - X_P) \quad \text{(XIX)}$$

where

Y = the output signal 295 from the lead time block 294;

X = the input signal 293 to the lead time block 294;

LT = a constant;

$S_i$ = the sample interval for the computer means 100; and

XP = the value of signal 293 for the previous sample interval.

It is noted that, if signal 293 for the present sample interval is equal to signal 293 for the past sample interval, signal 293 will equal signal 295. The output signal 295 from the lead time block 294 is provided as an input to the multiplying block 286.

Signal 285 is multiplied by signal 295 in the multiplying block 286 to provide signal 297 as an input to the controller block 298. Signal 297 is representative of the predicted outlet velocity corrected by the measured outlet velocity. The controller 298 is also provided with a setpoint signal 299 which is representative of the desired outlet velocity. In response to signals 297 and 299, the controller 298, which is a digital implementation of a proportional-integral controller, provides an output signal 301 which is responsive to the difference between signals 297 and 299. Signal 301 is scaled so as to be representative of the number of pounds of steam which must be provided for each pound of feed to maintain the desired outlet velocity represented by signal 299. Signal 301 is provided from the controller 298 as an input to the multiplying block 216.

Signal 301 is multiplied by signal 212 in the multiplying block 216 to provide signal 91 which is representative of the number of pounds of steam which must be provided to the cracking furnace 11 to maintain the actual outlet velocity equal to the desired outlet velocity represented by signal 299. Signal 91 is provided as the output control signal from computer means 100 and is utilized as described in FIG. 1.

The predicted outlet velocity which is represented by signal 285 provides feedforward control for the cracking furnace 11. The measured outlet velocity represented by signal 259 provides feedback control for the cracking furnace 11. This is accomplished by dividing the predicted outlet velocity, represented by signal 285, by the measured outlet velocity, represented by signal 259, after the predicted outlet velocity has been delayed. It is noted that, if the predicted outlet velocity, represented by signal 285, is equal to the measured outlet velocity, represented by signal 259, the output of the dividing block 261 will be equal to 1. Thus, if the model being utilized to predict the outlet velocity for the cracking furnace under the operating conditions for the cracking furnace is accurate, then only the feedforward portion of the control for the cracking furnace will be utilized. Only when the prediction varies from the actual measured outlet velocity will the actual measured outlet velocity be utilized to correct the prediction and thus provide feedback control of the cracking furnace.

The predicted outlet velocity, represented by signal 285, is available much more quickly than the measured outlet velocity represented by signal 259. It is thus noted that the control system of the present invention can react very quickly to a change in any of the process variables associated with the cracking furnace 11 which provides improved control of the cracking furnace 11 and which results in the product specifications for the cracking furnace being met with little variance and with minimal coking.

Figure 3:
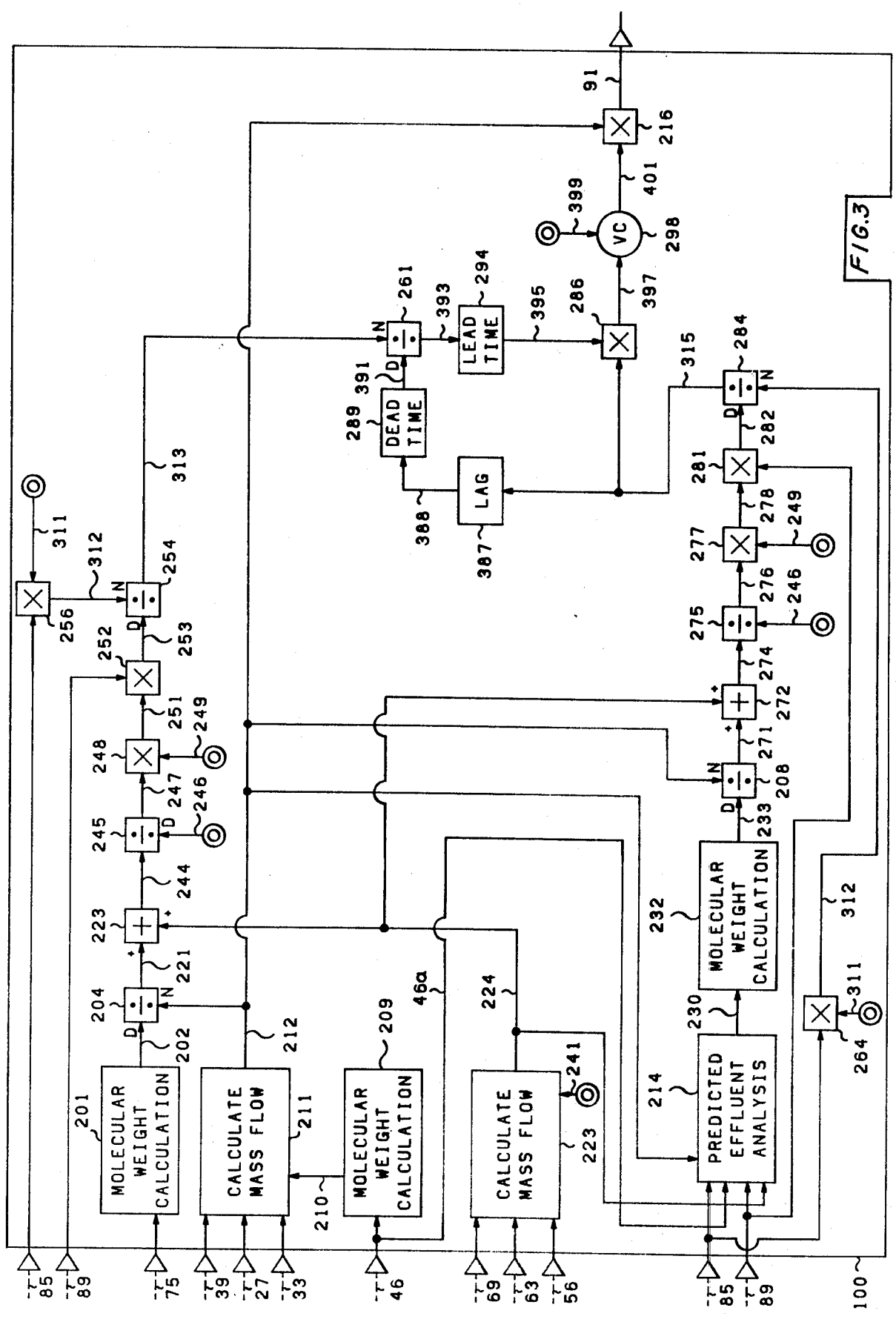
FIG. 3 is a logic diagram for the computer logic utilized to generate the control signals utilized in the control of the residence time for the cracking furnace illustrated in FIG. 1.

The following development of control signal 91, where signal 91 is representative of the flow rate of the steam required to maintain a desired residence time for the cracking furnace 11, is provided to clarify the logic flow diagram illustrated in FIG. 3. As has been previously stated, the P-V-T relationship for a gas is given by the ideal gas law equation:

(I) $PV = NRT$ where $V$, $P$, $T$, $R$ and $N$ are as previously defined.

If V is redefined as the volume of the gas contained in the cracking tubes 12A and 12B of the cracking furnace 11 and N is defined as the number of mols of gas flowing from the cracking furnace 11 per second, then equation 1 may be rearranged to give:

(XX) Residence Time $= (VC)(P)/(NRT)$ where
   $VC =$ equal volume of cracking coils 12$a$ and 12$b$; and
   N, P, R and T are as previously defined for Equation (II).

Equation (XX) is solved in FIG. 3 utilizing the described inputs to computer means 100 to provide signal 91 which is representative of the flow rate of the steam required to maintain a desired residence time for the cracking furnace 11.

The logic flow diagram utilized to calculate the control signal 91, where the control 91 is representative of the flow rate of the steam required to maintain a desired residence time in the cracking furnace 11, in response to the previously described input signals to the computer means 100 is illustrated in FIG. 3. Referring now to FIG. 3, signal 253, which is representative of NRT based on the measured analysis, is generated in exactly the same manner as previously described for FIG. 2. Signal 253 is provided as a first input to the dividing block 254.

Signal 85, which is representative of the pressure of the gaseous mixture flowing from the cracking furnace 11 (P), is again provided to the multiplying means 256. The multiplying block 256 is also provided with a set point signal 311, which is representative of the volume of the cracking coils 12$a$ and 12$b$ (VC), as a second input. Signal 311 is multiplied by signal 85 to provide signal 312, which is representative of (P)(VC). Signal 312 is provided from the multiplying block 256 as a second input to the dividing block 254. Signal 312 is divided by signal 253 to provide signal 313 which is representative of the measured residence time for the cracking furnace 11. Signal 313 is provided as a first input to the dividing block 261.

Signal 282, which is representative of NRT based on the predicted effluent analysis, is generated in exactly the same manner as has been previously described in FIG. 2. Signal 282 is provided as a first input to the dividing block 284. Signal 85, which is representative of the pressure of the gaseous mixture flowing from the cracking furance 11 (P), is again provided as a first input to the multiplying block 264. The multiplying block 264 is also provided with the set point signal 311 which is representative of the volume of the cracking tubes 12$a$ and 12$b$ (VC). Signal 85 is multiplied by a signal 311 in the multiplying block 264 to provide signal 312, which is representative of (P)(VC). Signal 312 is provided from the multiplying block 264 as a second input to the dividing block 284. Signal 312 is divided by signal 282 to provide signal 315, which is representative of the predicted residence time for the cracking furnace 11. Signal 285 is provided as an input to the multiplying block 286 and as an input to the lag block 287.

The lag block 387 is a delay which is equal to the time required for a change in the flow rate of the steam flowing through conduit means 16 to the cracking furnace 11 to cause a change in the residence time for the cracking furnace 11. The output signal 388 from lag block 387 is provided to the dead time block 289. The dead time block 289 is a delay representative of the effluent chromatographic analyzer sample times. The dead time delay represented by the dead time block 289 would typically be on the order of 30 minutes. Signal 391 from the dead time block 289 is thus representative of the predicted residence time delayed so as to compensate for propagation delays through the cracking furnace 11 and to compensate for the chromatographic analyzer sample time. Signal 391 is provided from the dead time block 289 as an input to the dividing block 261.

Signal 313 is divided by signal 391 in the dividing block 261 to establish signal 393. Signal 393 is provided from the dividing block 261 to the lead time block 294.

The lead time block 294 is essentially utilized as a trend predicting device. Thus, if the flow rate of steam to the cracking furnace 11 has been decreasing over a period of time the lead time block 294 is utilized to analyze this trend and provide predictive control which parallels a trend. In response to signal 393 the lead time block 294 provides an output signal 395 utilizing equation (XVII). It is noted that, if signal 393 for the present sample interval is equal to signal 393 for the past sample interval, signal 393 will equal signal 395. The output signal 395 from the lead time block 294 is provided as an input to the multiplying block 286.

Signal 315 is multiplied by signal 395 in the multiplying block 286 to provide signal 397 as an input to the controller block 298. Signal 397 is representative of the predicted residence time corrected by the measured residence time. The controller 298 is also provided with a setpoint signal 399 which is representative of the desired residence time. In response to signals 397 and 399, the controller 298, which is a digital implementation of a proportional-integral controller, provides an output signal 401 which is responsive to the difference between signals 397 and 399. Signal 401 is scaled so as to be representative of the number of pounds of steam which must be provided for each pound of feed to maintain the desired residence time represented by signal 399. Signal 401 is provided from the controller 298 as an input to the multiplying block 216.

Signal 401 is multiplied by signal 212 in the multiplying block 216 to provide signal 91 which is representative of the number of pounds of steam which must be provided to the cracking furnace 11 to maintain the actual residence time equal to the desired residence time represented by signal 399. Signal 91 is provided as the output control signal from computer means 100 and is utilized as described in FIG. 1.

The predicted residence time, which is represented by signal 315, provides feedforward control for the cracking furnace 11. The measured residence time, represented by signal 313, provides feedback control for the cracking furnace 11. This is accomplished by dividing the predicted residence time, represented by signal 315, by the measured residence time, represented by signal 313, after the predicted residence time has been delayed. It is noted that, if the predicted residence time, represented by signal 315, is equal to the measured residence time, represented by signal 313, the output of the dividing block 261 will be equal to 1. Thus, if the model being utilized to predict the residence time for the cracking furnace under the operating conditions for the cracking furnace is accurate, then only the feedforward portion of the control for the cracking furnace will be utilized. Only when the prediction varies from the actual measured residence time will the actual measured residence time be utilized to correct the prediction and thus provide feedback control of the cracking furnace.

The predicted residence time, represented by signal 285, is available much more quickly than the measured residence time represented by signal 259. It is thus noted that the control system of the present invention can react very quickly to a change in any of the process variables associated with the cracking furnace 11 which provides improved control of the cracking furnace 11 and which results in the product specifications for the cracking furnace being met with little or no variance and with minimal coking.

The invention has been described in terms of a preferred embodiment as illustrated in FIGS. 1, 2 and 3. Specific components which can be utilized in the practice of the invention as illustrated in FIGS. 1 and 2 such as flow sensors 36 and 65; flow transducers 34 and 64; pressure transducers 29, 51, and 81; temperature transducers 23, 58, and 86; flow controller 93; I/P converter 95; and pneumatic control valve 97 are each well known, commercially available control components such as are illustrated and described at length in Perry's *Chemical Engineers' Handbook*, 4th Edition, Chapter 22, McGraw-Hill. A suitable analyzer 41, 71 and 101 is the process chromatograph system, Model 102, manufactured by Applied Automation, Inc., Bartlesville, Okla.

A suitable A/D converter 45, 38, 32, 26, 68, 61, 54, 88, 84, and 74 is the MM 5357/8 bit A/D converter manufactured National Semiconductor Corporation, Santa Clara, Calif. A suitable D/A converter 91 is the A/D 559/8 bit D/A converter manufactured by Analog Devices, Norwood, Mass. Computer means 100 is preferable an Optrol 3600 manufactured by Applied Automation, Inc., Bartlesville, Okla.

While the invention has been described in terms of the presently preferred embodiment, reasonable variations and modifications are possible by those skilled in the art within the scope of the described invention and the appended claims.

That which is claimed is:

1. Apparatus comprising:
   a cracking furnace means containing at least one cracking tube;
   means for supplying a feed stream to said cracking furnace means;
   means for supplying a diluent fluid to said cracking furnace means, said diluent fluid being combined with said feed stream;
   means for supplying a fuel to said cracking furnace means, the combustion of said fuel supplying heat to said cracking furnace means;
   means for removing a gaseous mixture, containing the products produced from the cracked components of said feed stream and containing said diluent fluid, from said cracking furnace means;
   means for establishing a first signal representative of a prediction of the outlet velocity of said gaseous mixture from said cracking furnace means;
   means for establishing a second signal representative of the actual outlet velocity of said gaseous mixture from said cracking furnace means;
   means for establishing a third signal representative of a correction factor in response to said first signal and said second signal;
   means for combining said first signal and said third signal to establish a fourth signal representative of a corrected prediction of the outlet velocity of said gaseous mixture from said cracking furnace means;

means for establishing a fifth signal representative of the desired outlet velocity of said gaseous mixture from said cracking furnace means;

means for comparing said fourth signal and said fifth signal and for establishing a sixth signal responsive to the difference between said fourth signal and said fifth signal; and means for manipulating the flow rate of said diluent fluid to said cracking furnace means in response to said sixth signal to thereby control the outlet velocity of said gaseous mixture from said cracking furnace means.

2. Apparatus in accordance with claim 1 wherein said means for establishing said first signal comprises:

means for establishing a seventh signal representative of a prediction of the mol flow rate of said gaseous mixture ($N_P$);

means for establishing an eighth signal representative of a gas constant (R);

means for multiplying said seventh signal by said eighth signal to establish a ninth signal representative of ($N_P$)(R);

means for establishing a tenth signal representative of the temperature of said gaseous mixture (T);

means for multiplying said tenth signal by said ninth signal to establish an eleventh signal representative of ($N_P$)(R)(T);

means for establishing a twelfth signal representative of the pressure of said gaseous mixture (P);

means for establishing a thirteenth signal representative of the total cross-sectional area of the cracking tubes in said cracking furnace (A);

means for multiplying said twelfth signal by said thirteenth signal to establish a fourteenth signal representative of (P)(A); and means for dividing said eleventh signal by said fourteenth signal to establish said first signal.

3. Apparatus in accordance with claim 2 wherein said means for establishing said seventh signal comprises:

means for establishing a plurality of fifteenth signals, each one of said plurality of fifteenth signals being representative of a prediction of the mol percentage of a respective one of the components in said gaseous mixture;

means for establishing a plurality of sixteenth signals, each one of said plurality of sixteenth signals being representative of the molecular weight of a respective one of said components in said gaseous mixture;

means for establishing a seventeenth signal representative of a prediction of molecular weight of said gaseous mixture ($MW_P$) in response to said plurality of fifteenth signals and said plurality of sixteenth signals;

means for establishing an eighteenth signal representative of the flow rate of said feed stream ($F_R$);

means for dividing said eighteenth signal by said seventeenth signal to establish a nineteenth signal representative of the mol flow rate of said gaseous mixture contributed by said feed stream ($F_R$)/($MW_P$);

means for establishing a twentieth signal representative of the flow rate of said diluent fluid ($S_R$);

means for establishing a twenty-first signal representative of the molecular weight of said diluent fluid ($MW_S$);

means for dividing said twentieth signal by said twenty-first signal to establish a twenty-second signal representative of the mol flow rate of said gaseous mixture contributed by said diluent fluid ($S_R$)/($MW_S$); and means for summing said nineteenth signal and said twentieth signal to establish said seventh signal.

4. Apparatus in accordance with claim 3 wherein said means for establishing said plurality of fifteenth signals comprises:

means for establishing a plurality of twenty-third signals, each one of said plurality of twenty-third signals being representative of the actual mol percentage of a respective one of the components in said feed stream; and means for establishing said plurality of fifteenth signals in response to said tenth signal, said twelfth signal, said eighteenth signal, said twentieth signal, and at least one of said plurality of twenty-third signals.

5. Apparatus in accordance with claim 4 wherein said means for establishing said seventeenth signal comprises:

means for multiplying each one of said plurality of fifteenth signals by a respective one of said plurality of sixteenth signals which corresponds to the same component in said gaseous mixture; and means for summing the results of the multiplication of each one of said plurality of fifteenth signals by a respective one of said plurality of sixteenth signals to establish said seventeenth signal.

6. Apparatus in accordance with claim 5 wherein said means for establishing said plurality of twenty-third signals comprises a chromatographic analyzer means.

7. Apparatus in accordance with claim 6 wherein said at least one of said plurality of twenty-third signals is representative of the measured mol percent of ethane in said feed stream.

8. Apparatus in accordance with claim 6 wherein said at least one of said plurality of tenth signals is representative of the measured mol percent of propane in said feed stream.

9. Apparatus in accordance with claim 1 wherein said means for establishing said second signal comprises:

means for establishing a seventh signal representative of the actual mol flow rate of said gaseous mixture ($N_A$);

means for establishing an eighth signal representative of a gas constant (R);

means for multiplying said seventh signal by said eighth signal to establish a ninth signal representative of ($N_A$)(R);

means for establishing a tenth signal representative of the temperature of said gaseous mixture (T);

means for multiplying said tenth signal by said ninth signal to establish an eleventh signal representative of ($N_A$)(R)(T);

means for establishing a twelfth signal representative of the pressure of said gaseous mixture (P);

means for establishing a thirteenth signal representative of the total cross-sectional area of the cracking tubes in said cracking furnace (A);

means for multiplying said twelfth signal by said thirteenth signal to establish a fourteenth signal representative of (P)(A); and means for dividing said eleventh signal by said fourteenth signal to establish said second signal.

10. Apparatus in accordance with claim 9 wherein said means for establishing said seventh signal comprises:

means for establishing a plurality of fifteenth signals, each one of said plurality of fifteenth signals being representative of the actual percentage of a respective one of the components in said gaseous mixture;

means for establishing a plurality of sixteenth signals, each one of said plurality of sixteenth signals being representative of the molecular weight of a respective one of said components in said gaseous mixture;

means for establishing a seventeenth signal representative of the actual molecular weight of said gaseous mixture ($MW_A$) in response to said plurality of fifteenth signals and said plurality of sixteenth signals;

means for establishing an eighteenth signal representative of the flow rate of said feed stream ($F_R$);

means for dividing said eighteenth signal by said seventeenth signal to establish a nineteenth signal representative of the mol flow rate of said gaseous mixture controlled by said feed stream ($F_R$)/($MW_A$);

means for establishing a twentieth signal representative of the flow rate of said diluent fluid ($S_R$);

means for establishing a twenty-first signal representative of the molecular weight of said diluent fluid ($MW_S$);

means for dividing said twentieth signal by said twenty-first signal to establish a twenty-second signal representative of the mol flow rate of said gaseous mixture contributed by said diluent fluid ($S_R$)/($MW_S$); and means for summing said nineteenth signal and said twentieth signal to establish said seventh signal.

11. Apparatus in accordance with claim 10 wherein said means for establishing said seventeenth signal comprises:

means for multiplying each one of said plurality of fifteenth signals by a respective one of said plurality of sixteenth signals which corresponds to the same component in said gaseous mixture; and means for summing the results of the multiplication of each one of said plurality of fifteenth signals by a respective one of said plurality of sixteenth signals to establish said seventeenth signal.

12. Apparatus in accordance with claim 5 wherein said means for establishing said plurality of fifteenth signals comprises a chromatographic analyzer means.

13. Apparatus in accordance with claim 1 wherein said means for establishing that said third signal comprises means for dividing said second signal by said first signal.

14. Apparatus in accordance with claim 13 additionally comprising:

delay means;

means for providing said first signal to said delay means to thereby delay said first signal before said first signal is used to establish said third signal.

15. Apparatus in accordance with claim 1 wherein said means for combining said first signal and said third signal to establish said fourth signal comprises a multiplying means.

16. Apparatus in accordance with claim 15 additionally comprising:

a lead time means; and means for providing said third signal to said lead time means to thereby add process trend information to said third signal before said third signal is combined with said first signal to establish said fourth signal.

17. Apparatus in accordance with claim 1 wherein said means for comparing said fourth signal and said fifth signal and for establishing said sixth signal comprises a proportional-integral controller means.

18. Apparatus in accordance with claim 1 wherein said means for manipulating the flow rate of said diluent fluid to said cracking furnace means in response to said sixth signal comprises:

means for establishing a seventh signal representative of the flow rate of said feed stream;

means for multiplying said sixth signal by said seventh signal to establish an eighth signal representative of the number of pounds of said diluent fluid which must be provided per unit time to said cracking furnace means to maintain a desired outlet velocity for said gaseous mixture;

means for establishing a ninth signal representative of the actual flow rate of said diluent fluid;

means for comparing said eighth signal and said ninth signal and for establishing a tenth signal responsive to the difference between said eighth signal and said ninth signal; and means for manipulating the flow rate of said diluent fluid in response to said tenth signal.

19. A method for manipulating the outlet velocity for a cracking furnace comprising the steps of:

combining a feed stream provided to said cracking furnace with a diluent fluid;

supplying fuel to said cracking furnace, the combustion of said fuel supplying heat to said cracking furnace;

removing a gaseous mixture, containing the products produced from the cracked components of said feed stream and containing said diluent fluid, from said cracking furnace;

establishing a first signal representative of a prediction of the outlet velocity of said gaseous mixture from said cracking furnace means;

establishing a second signal representative of the actual outlet velocity of said gaseous mixture from said cracking furnace means;

establishing a third signal representative of a correction factor in response to said first signal and said second signal;

combining said first signal and said third signal to establish a fourth signal representative of a corrected prediction of the outlet velocity of said gaseous mixture from said cracking furnace means;

establishing a fifth signal representative of the desired outlet velocity of said gaseous mixture from said cracking furnace means;

comparing said fourth signal and said fifth signal and establishing a sixth signal responsive to the difference between said fourth signal and said fifth signal; and manipulating the flow rate of said diluent fluid to said cracking furnace means in response to said sixth signal to thereby control the outlet velocity of said gaseous mixture from said cracking furnace means.

20. A method in accordance with claim 19 wherein said step of establishing said first signal comprises:

establishing a seventh signal representative of a prediction of the mol flow rate of said gaseous mixture ($N_P$);

establishing an eighth signal representative of a gas constant (R);

multiplying said seventh signal by said eighth signal to establish a ninth signal representative of $(N_P)(R)$;

establishing a tenth signal representative of the temperature of said gaseous mixture (T);

multiplying said tenth signal by said ninth signal to establish an eleventh signal representative of $(N_P)(R)(T)$;

establishing a twelfth signal representative of the pressure of said gaseous mixture (P);

establishing a thirteenth signal representative of the total cross-sectional area of the cracking tubes in said cracking furnace (A);

multiplying said twelfth signal by said thirteenth signal to establish a fourteenth signal representative of (P)(A); and dividing said eleventh signal by said fourteenth signal to establish said first signal.

21. A method in accordance with claim 20 wherein said step of establishing said seventh signal comprises:

establishing a plurality of fifteenth signals, each one of said plurality of fifteenth signals being representative of a prediction of the mol percentage of a respective one of the components in said gaseous mixture;

establishing a plurality of sixteenth signals, each one of said plurality of sixteenth signals being representative of the molecular weight of a respective one of said components in said gaseous mixture;

establishing a seventeenth signal representative of a prediction of the molecular weight of said gaseous mixture ($MW_P$) in response to said plurality of fifteenth signals and said plurality of sixteenth signals;

establishing an eighteenth signal representative of the flow rate of said feed stream ($F_R$);

dividing said eighteenth signal by said seventeenth signal to establish a nineteenth signal representative of the mol flow rate of said gaseous mixture contributed by said feed stream $(F_R)/(MW_P)$;

establishing a twentieth signal representative of the flow rate of said diluent fluid ($S_R$);

establishing a twenty-first signal representative of the molecular weight of said diluent fluid ($MW_S$);

dividing said twentieth signal by said twenty-first signal to establish a twenty-second signal representative of the mol flow rate of said gaseous mixture contributed by said diluent fluid $(S_R)/(MW_S)$; and summing said nineteenth signal and said twentieth signal to establish said seventh signal.

22. A method in accordance with claim 21 wherein said step of establishing said plurality of fifteenth signals comprises:

establish a plurality of twenty-third signals, each one of said plurality of twenty-third signals being representative of the actual mol percentage of a respective one of the components in said feed stream; and establishing said plurality of fifteenth signals in response to said tenth signal, said twelfth signal, said eighteenth signal, said twentieth signal, and at least one of said plurality of twenty-third signals.

23. A method in accordance with claim 22 wherein said step of establishing said seventeenth signal comprises:

multiplying each one of said plurality of fifteenth signals by a respective one of said plurality of sixteenth signals which corresponds to the same component in said gaseous mixture; and summing the results of the multiplication of each one of said plurality of fifteenth signals by a respective one of said plurality of sixteenth signals to establish said seventeenth signal.

24. A method in accordance with claim 23 wherein said step of establishing said plurality of twenty-third signals comprises performing a chromatographic analysis on said feed stream.

25. A method in accordance with claim 24 wherein said at least one of said plurality of twenty-third signals is representative of the measured mol percent of ethane in said feed stream.

26. A method in accordance with claim 24 wherein said at least one of said plurality of tenth signals is representative of the measured mol percent of propane in said feed stream.

27. A method in accordance with claim 19 wherein said step of establishing said second signal comprises:

establishing a seventh signal representative of the actual mol flow rate of said gaseous mixture ($N_A$);

establishing an eighth signal representative of a gas constant (R);

multiplying said seventh signal by said eighth signal to establish a ninth signal representative of $(N_A)(R)$;

establishing a tenth signal representative of the temperature of said gaseous mixture (T);

multiplying said tenth signal by said ninth signal to establish an eleventh signal representative of $(N_A)(R)(T)$;

establishing a twelfth signal representative of the pressure of said gaseous mixture (P);

establishing a thirteenth signal representative of the total cross-sectional area of the cracking tubes in said cracking furnace (A);

multiplying said twelfth signal by said thirteenth signal to establish a fourteenth signal representative of (P)(A); and dividing said eleventh signal by said fourteenth signal to establish said second signal.

28. A method in accordance with claim 27 wherein said step of establishing said seventh signal comprises:

establishing a plurality of fifteenth signals, each one of said plurality of fifteenth signals being representative of the actual mol percentage of a respective one of the components in said gaseous mixture;

establishing a plurality of sixteenth signals, each one of said plurality of sixteenth signals being representative of the molecular weight of a respective one of said components in said gaseous mixture;

establishing a seventeenth signal representative of the actual molecular weight of said gaseous mixture ($MW_A$) in response to said plurality of fifteenth signals and said plurality of sixteenth signals;

establishing an eighteenth signal representative of the flow rate of said feed stream ($F_R$);

dividing said eighteenth signal by said seventeenth signal to establish a nineteenth signal representative of the mol flow rate of said gaseous mixture contributed by said feed stream $(F_R)/(MW_A)$;

establishing a twentieth signal representative of the flow rate of said diluent fluid ($S_R$);

establishing a twenty-first signal representative of the molecular weight of said diluent fluid ($MW_S$);

dividing said twentieth signal by said twenty-first signal to establish a twenty-second signal representative of the mol flow rate of said gaseous mixture contributed by said diluent fluid $(S_R)/(MW_S)$; and summing said nineteenth signal and said twentieth signal to establish said seventh signal.

29. A method in accordance with claim 28 wherein said step of establishing said seventeenth signal comprises:

multiplying each one of said plurality of fifteenth signals by a respective one of said plurality of sixteenth signals which corresponds to the same component in said gaseous mixture; and summing the results of the multiplication of each one of said plurality of fifteenth signals by a respective one of said plurality of sixteenth signals to establish said seventeenth signal.

30. A method in accordance with claim 29 wherein said step of establishing said plurality of fifteenth signals comprises performing a chromatographic analysis on said feed stream.

31. A method in accordance with claim 19 wherein said step of establishing that said third signal comprises dividing said second signal by said first signal.

32. A method in accordance with claim 31 additionally comprising the step of delaying said first signal before said first signal is used to establish said third signal.

33. A method in accordance with claim 19 wherein said step of combining said first signal and said third signal to establish said fourth signal comprises multiplying said first signal by said third signal.

34. A method in accordance with claim 33 additionally comprising the step of:

adding process trend information to said third signal before said third signal is combined with said first signal to establish said fourth signal.

35. A method in accordance with claim 19 wherein said step of manipulating the flow rate of said diluent fluid to said cracking furnace means in response to said sixth signal comprises:

establishing a seventh signal representative of the flow rate of said feed stream;

multiplying said sixth signal by said seventh signal to establish an eighth signal representative of the number pound of said diluent fluid which must be provided per unit time to said cracking furnace means to maintain a desired outlet velocity for said gaseous mixture;

establishing a ninth signal representative of the actual flow rate of said diluent fluid;

comparing said eighth signal and said ninth signal and establishing a tenth signal responsive to the difference between said eighth signal and said ninth signal; and manipulating the flow rate of said diluent fluid in response to said tenth signal.

36. Apparatus comprising:

a cracking furnace means containing at least one cracking tube;

means for supplying a feed stream to said cracking furnace means;

means for supplying a diluent fluid to said cracking furnace means, said diluent fluid being combined with said feed stream;

means for supplying a fuel to said cracking furnace means, the combustion of said fuel supplying heat to said cracking furnace means;

means for removing a gaseous mixture, containing the products produced from the cracked components of said feed stream and containing said diluent fluid, from said cracking furnace means;

means for establishing a first signal representative of a prediction of the residence time of the combined feed stream and diluent fluid in said cracking furnace means;

means for establishing a second signal representative of the actual residence time of said combined feedstream and diluent fluid in said cracking furnace means;

means for establishing a third signal representative of a correction factor in response to said first signal and said second signal;

means for combining said first signal and said third signal to establish a fourth signal representative of a corrected prediction of the residence time of said combined feedstream and diluent fluid in said cracking furnace means;

means for establishing a fifth signal representative of the desired residence time of said combined feedstream and diluent fluid in said cracking furnace means;

means for comparing said fourth signal and said fifth signal and for establishing a sixth signal responsive to the difference between said fourth signal and said fifth signal; and means for manipulating the flow rate of said diluent fluid to said cracking furnace means in response to said sixth signal to thereby control the residence time of said combined feedstream and diluent fluid in said cracking furnace means.

37. Apparatus in accordance with claim 36 wherein said means for establishing said first signal comprises:

means for establishing a seventh signal representative of a prediction of the mol flow rate of said gaseous mixture $(N_P)$;

means for establishing an eighth signal representative of a gas constant (R);

means for multiplying said seventh signal by said eighth signal to establish a ninth signal representative of $(N_P)(R)$;

means for establishing a tenth signal representative of the temperature of said gaseous mixture (T);

means for multiplying said tenth signal by said ninth signal to establish an eleventh signal representative of $(N_P)(R)(T)$;

means for establishing a twelfth signal representative of the pressure of said gaseous mixture (P);

means for establishing a thirteenth signal representative of the total volume of the cracking tubes in said cracking furnace (VC);

means for multiplying said twelfth signal by said thirteenth signal to establish a fourteenth signal representative of (P)(VC); and means for dividing said fourteenth signal by said eleventh signal to establish said first signal.

38. Apparatus in accordance with claim 37 wherein said means for establishing said seventh signal comprises:

means for establishing a plurality of fifteenth signals, each one of said plurality of fifteenth signals being representative of a prediction of the mol percentage of a respective one of the components in said gaseous mixture;

means for establishing a plurality of sixteenth signals, each one of said plurality of sixteenth signals being representative of the molecular weight of a respective one of said components in said gaseous mixture;

means for establishing a seventeenth signal representative of a prediction of molecular weight of said gaseous mixture ($MW_P$) in response to said plurality of fifteenth signals and said plurality of sixteenth signals;

means for establishing an eighteenth signal representative of the flow rate of said feed stream ($F_R$);

means for dividing said eighteenth signal by said seventeenth signal to establish a nineteenth signal representative of the mol flow rate of said gaseous mixture contributed by said feed stream ($F_R$)/($MW_P$);

means for establishing a twentieth signal representative of the flow rate of said diluent fluid ($S_R$);

means for establishing a twenty-first signal representative of the molecular weight of said diluent fluid ($MW_S$);

means for dividing said twentieth signal by said twenty-first signal to establish a twenty-second signal representative of the mol flow rate of said gaseous mixture contributed by said diluent fluid ($S_R$)/($MW_S$); and means for summing said nineteenth signal and said twentieth signal to establish said seventh signal.

39. Apparatus in accordance with claim 38 wherein said means for establishing said plurality of fifteenth signals comprises:

means for establishing a plurality of twenty-third signals, each one of said plurality of twenty-third signals being representative of the actual mol percentage of a respective one of the components in said feed stream; and means for establishing said plurality of fifteenth signals in response to said tenth signal, said twelfth signal, said eighteenth signal, said twentieth signal, and at least one of said plurality of twenty-third signals.

40. Apparatus in accordance with claim 39 wherein said means for establishing said seventeenth signal comprises:

means for multiplying each one of said plurality of fifteenth signals by a respective one of said plurality of sixteenth signals which corresponds to the same component in said gaseous mixture; and means for summing the results of the multiplication of each one of said plurality of fifteenth signals by a respective one of said plurality of sixteenth signals to establish said seventeenth signal.

41. Apparatus in accordance with claim 40 wherein said means for establishing said plurality of twenty-third signals comprises a chromatographic analyzer means.

42. Apparatus in accordance with claim 41 wherein said at least one of said plurality of twenty-third signals is representative of the measured mol percent of ethane in said feed stream.

43. Apparatus in accordance with claim 41 wherein said at least one of said plurality of tenth signals is representative of the measured mol percent of propane in said feed stream.

44. Apparatus in accordance with claim 36 wherein said means for establishing said second signal comprises:

means for establishing a seventh signal representative of the actual mol flow rate of said gaseous mixture ($N_A$);

means for establishing an eighth signal representative of a gas constant (R);

means for multiplying said seventh signal by said eighth signal to establish a ninth signal representative of ($N_A$)(R);

means for establishing a tenth signal representative of the temperature of said gaseous mixture (T);

means for multiplying said tenth signal by said ninth signal to establish an eleventh signal representative of ($N_A$)(R)(T);

means for establishing a twelfth signal representative of the pressure of said gaseous mixture (P);

means for establishing a thirteenth signal representative of the total volume of the cracking tubes in said cracking furnace (VC);

means for multiplying said twelfth signal by said thirteenth signal to establish a fourteenth signal representative of (P)(VC); and means for dividing said fourteenth signal by said eleventh signal to establish said second signal.

45. Apparatus in accordance with claim 44 wherein said means for establishing said seventh signal comprises:

means for establishing a plurality of fifteenth signals, each one of said plurality of fifteenth signals being representative of the actual percentage of a respective one of the components in said gaseous mixture;

means for establishing a plurality of sixteenth signals, each one of said plurality of sixteenth signals being representative of the molecular weight of a respective one of said components in said gaseous mixture;

means for establishing a seventeenth signal representative of the actual molecular weight of said gaseous mixture ($MW_A$) in response to said plurality of fifteenth signals and said plurality of sixteenth signals;

means for establishing an eighteenth signal representative of the flow rate of said feed stream ($F_R$);

means for dividing said eighteenth signal by said seventeenth signal to establish a nineteenth signal representative of the mol flow rate of said gaseous mixture contributed by said feed stream ($F_R$)/($MW_A$);

means for establishing a twentieth signal representative of the flow rate of said diluent fluid ($S_R$);

means for establishing a twenty-first signal representative of the molecular weight of said diluent fluid ($MW_S$);

means for dividing said twentieth signal by said twenty-first signal to establish a twenty-second signal representative of the mol flow rate of said gaseous mixture contributed by said diluent fluid ($S_R$)/($MW_S$); and means for summing said nineteenth signal and said twentieth signal to establish said seventh signal.

46. Apparatus in accordance with claim 45 wherein said means for establishing said seventeenth signal comprises:

means for multiplying each one of said plurality of fifteenth signals by a respective one of said plurality of sixteenth signals which corresponds to the same component in said gaseous mixture; and means for summing the results of the multiplication of each one of said plurality of fifteenth signals by a respective one of said plurality of sixteenth signals to establish said seventeenth signal.

47. Apparatus in accordance with claim 40 wherein said means for establishing said plurality of fifteenth signals comprises a chromatographic analyzer means.

48. Apparatus in accordance with claim 36 wherein said means for establishing that said third signal comprises means for dividing said second signal by said first signal.

49. Apparatus in accordance with claim 48 additionally comprising:
delay means;
means for providing said first signal to said delay means to thereby delay said first signal before said first signal is used to establish said third signal.

50. Apparatus in accordance with claim 36 wherein said means for combining said first signal and said third signal to establish said fourth signal comprises a multiplying means.

51. Apparatus in accordance with claim 50 additionally comprising:
a lead time means; and
means for providing said third signal to said lead time means to thereby add process trend information to said third signal before said third signal is combined with said first signal to establish said fourth signal.

52. Apparatus in accordance with claim 36 wherein said means for comparing said fourth signal and said fifth signal and for establishing said sixth signal comprises a proportional-integral controller means.

53. Apparatus in accordance with claim 36 wherein said means for manipulating the flow rate of said diluent fluid to said cracking furnace means in response to said sixth signal comprises:
means for establishing a seventh signal representative of the flow rate of said feed stream;
means for multiplying said sixth signal by said seventh signal to establish an eighth signal representative of the number of pounds of said diluent fluid which must be provided per unit time to said cracking furnace means to maintain a desired residence time of said combined stream and diluent fluid in said cracking furnace means;
means for establishing a ninth signal representative of the actual flow rate of said diluent fluid;
means for comparing said eighth signal and said ninth signal and for establishing a tenth signal responsive to the difference between said eighth signal and said ninth signal; and
means for manipulating the flow rate of said diluent fluid in response to said tenth signal.

54. A method for manipulating the residence time for a cracking furnace comprising the steps of:
combining a feed stream provided to said cracking furnace with a diluent fluid;
supplying fuel to said cracking furnace, the combustion of said fuel supplying heat to said cracking furnace;
removing a gaseous mixture, containing the products produced from the cracked components of said feed stream and containing said diluent fluid, from said cracking furnace;
establishing a first signal representative of a prediction of the residence time of the combined feed stream and diluent fluid in said cracking furnace means;
establishing a second signal representative of the actual residence time of said combined feed stream and diluent fluid in said cracking furnace means;
establishing a third signal representative of a correction factor in response to said first signal and said second signal;
combining said first signal and said third signal to establish a fourth signal representative of a corrected prediction of the residence time of said combined feed stream and diluent fluid in said cracking furnace means;
establishing a fifth signal representative of the desired residence time of said combined feed stream and diluent fluid in said cracking means;
comparing said fourth signal and said fifth signal and establishing a sixth signal responsive to the difference between said fourth signal and said fifth signal; and
manipulating the flow rate of said diluent fluid to said cracking furnace means in response to said sixth signal to thereby control the residence time of said combined feed stream and diluent fluid in said cracking furnace means.

55. A method in accordance with claim 54 wherein said step of establishing said first signal comprises:
establishing a seventh signal representative of a prediction of the mol flow rate of said gaseous mixture ($N_P$);
establishing an eighth signal representative of a gas constant (R);
multiplying said seventh signal by said eighth signal to establish a ninth signal representative of ($N_P$)(R);
estabishing a tenth signal representative of the temperature of said gaseous mixture (T);
multiplying said tenth signal by said ninth signal to establish an eleventh signal representative of ($N_P$)(R)(T);
establishing a twelfth signal representative of the pressure of said gaseous mixture (P);
establishing a thirteenth signal representative of the total volume of the cracking tubes in said cracking furnace (VC);
multiplying said twelfth signal by said thirteenth signal to establish a fourteenth signal representative of (P)(VC); and
dividing said fourteenth signal by said eleventh signal to establish said first signal.

56. A method in accordance with claim 55 wherein said step of establishing said seventh signal comprises:
establishing a plurality of fifteenth signals, each one of said plurality of fifteenth signals being representative of a prediction of the mol percentage of a respective one of the components in said gaseous mixture;
establishing a plurality of sixteenth signals, each one of said plurality of sixteenth signals being representative of the molecular weight of a respective one of said components in said gaseous mixture;
establishing a seventeenth signal representative of a prediction of the molecular weight of said gaseous mixture ($MW_P$) in response to said plurality of fifteenth signals and said plurality of sixteenth signals;
establishing an eighteenth signal representative of the flow rate of said feed stream ($F_R$);
dividing said eighteenth signal by said seventeenth signal to establish a nineteenth signal representative of the mol flow rate of said gaseous mixture contributed by said feed stream ($F_R$)/($MW_P$);
establishing a twentieth signal representative of the flow rate of said diluent fluid ($S_R$);
establishing a twenty-first signal representative of the molecular weight of said diluent fluid ($MW_S$);

dividing said twentieth signal by said twenty-first signal to establish a twenty-second signal representative of the mol flow rate of said gaseous mixture contributed by said diluent fluid $(S_R)/(MW_S)$; and summing said nineteenth signal and said twentieth signal to establish said seventh signal.

57. A method in accordance with claim 56 wherein said step of establishing said plurality of fifteenth signals comprises:

establish a plurality of twenty-third signals, each one of said plurality of twenty-third signals being representative of the actual mol percentage of a respective one of the components in said feed stream; and establishing said plurality of fifteenth signals in response to said tenth signal, said twelfth signal, said eighteenth signal, said twentieth signal, and at least one of said plurality of twenty-third signals.

58. A method in accordance with claim 57 wherein said step of establishing said seventeenth signal comprises:

multiplying each one of said plurality of fifteenth signals by a respective one of said plurality of sixteenth signals which corresponds to the same component in said gaseous mixture; and summing the results of the multiplication of each one of said plurality of fifteenth signals by a respective one of said plurality of sixteenth signals to establish said seventeenth signal.

59. A method in accordance with claim 58 wherein said step of establishing said plurality of twenty-third signals comprises performing a chromatographic analysis on said feed stream.

60. A method in accordance with claim 59 wherein said at least one of said plurality of twenty-third signals is representative of the measured mol percent of ethane in said feed stream.

61. A method in accordance with claim 59 wherein said at least one of said plurality of tenth signals is representative of the measured mol percent of propane in said feed stream.

62. A method in accordance with claim 54 wherein said step of establishing said second signal comprises:

establishing a seventh signal representative of the actual mol flow rate of said gaseous mixture ($N_A$);

establishing an eighth signal representative of a gas constant (R);

multiplying said seventh signal by said eighth signal to establish a ninth signal representative of $(N_A)(R)$;

establishing a tenth signal representative of the temperature of said gaseous mixture (T);

multiplying said tenth signal by said ninth signal to establish an eleventh signal representative of $(N_A)(R)(T)$;

establishing a twelfth signal representative of the pressure of said gaseous mixture (P);

establishing a thirteenth signal representative of the total volume of the cracking tubes in said cracking furnace (VC);

multiplying said twelfth signal by said thirteenth signal to establish a fourteenth signal representative of (P)(VC); and dividing said fourteenth signal by said eleventh signal to establish said second signal.

63. A method in accordance with claim 62 wherein said step of establishing said seventh signal comprises:

establishing a plurality of fifteenth signals, each one of said plurality of fifteenth signals being representative of the actual mol percentage of a respective one of the components in said gaseous mixture;

establishing a plurality of sixteenth signals, each one of said plurality of sixteenth signals being representative of the molecular weight of a respective one of said components in said gaseous mixture;

establishing a seventeenth signal representative of the actual molecular weight of said gaseous mixture ($MW_A$) in response to said plurality of fifteenth signals and said plurality of sixteenth signals;

establishing an eighteenth signal representative of the flow rate of said feed stream ($F_R$);

dividing said eighteenth signal by said seventeenth signal to establish a nineteenth signal representative of the mol flow rate of said gaseous mixture contributed by said feed stream $(F_R)/(MW_P)$;

establishing a twentieth signal representative of the flow rate of said diluent fluid ($S_R$);

establishing a twenty-first signal representative of the molecular weight of said diluent fluid ($MW_S$);

dividing said twentieth signal by said twenty-first signal to establish a twenty-second signal representative of the mol flow rate of said gaseous mixture contributed by said diluent fluid $(S_R)/(MW_S)$; and summing said nineteenth signal and said twentieth signal to establish said seventh signal.

64. A method in accordance with claim 63 wherein said step of establishing said seventeenth signal comprises:

multiplying each one of said plurality of fifteenth signals by a respective one of said plurality of sixteenth signals which corresponds to the same component in said gaseous mixture; and summing the results of the multiplication of each one of said plurality of fifteenth signals by a respective one of said plurality of sixteenth signals to establish said seventeenth signal.

65. A method in accordance with claim 64 wherein said step of establishing said plurality of fifteenth signals comprises performing a chromatographic analysis on said feed stream.

66. A method in accordance with claim 54 wherein said step of establishing that said third signal comprises dividing said second signal by said first signal.

67. A method in accordance with claim 66 additionally comprising the step of delaying said first signal before said first signal is used to establish said third signal.

68. A method in accordance with claim 54 wherein said step of combining said first signal and said third signal to establish said fourth signal comprises multiplying said first signal by said third signal.

69. A method in accordance with claim 68 additionally comprising the step of:

adding process trend information to said third signal before said third signal is combined with said first signal to establish said fourth signal.

70. A method in accordance with claim 54 wherein said step of manipulating the flow rate of said diluent fluid to said cracking furnace means in response to said sixth signal comprises:

establishing a seventh signal representative of the flow rate of said feed stream;

multiplying said sixth signal by said seventh signal to establish an eighth signal representative of the number pound of said diluent fluid which must be provided per unit time to said cracking furnace means to maintain a desired residence time of said combined feed stream and diluent fluid in said cracking furnace means;

establishing a ninth signal representative of the actual flow rate of said diluent fluid;

comparing said eighth signal and said ninth signal and establishing a tenth signal responsive to the difference between said eighth signal and said ninth signal; and manipulating the flow rate of said diluent fluid in response to said tenth signal.

* * * * *